(12) United States Patent
Brownhill et al.

(10) Patent No.: US 7,266,589 B2
(45) Date of Patent: Sep. 4, 2007

(54) SERVICE-PORTAL ENABLED AUTOMATION CONTROL MODULE (ACM)

(75) Inventors: Carrie Brownhill, Earlysville, VA (US); Bill Huntley, Earlysville, VA (US); David Collier, Charlottesville, VA (US); Ferrell Mercer, Earlysville, VA (US); Jason Kadingo, Palmyra, VA (US); Brad Bolfing, Charlottesville, VA (US); Dan Miller, Waynesboro, VA (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 09/682,280

(22) Filed: Aug. 13, 2001

(65) Prior Publication Data

US 2003/0033376 A1 Feb. 13, 2003

(51) Int. Cl.
*G06F 15/16* (2006.01)

(52) U.S. Cl. ............ 709/218; 709/219; 709/220; 709/250

(58) Field of Classification Search ........ 709/203, 709/217–218, 219–220, 221, 226, 227, 236, 709/250, 222, 247, 223, 249; 711/133; 725/46; 342/357.11; 701/4, 312; 707/1; 705/1, 705/4, 26–27
See application file for complete search history.

(56) References Cited

U.S. PATENT DOCUMENTS

| | | | | |
|---|---|---|---|---|
| 5,534,875 A * | 7/1996 | Diefes et al. | ........... | 342/357.11 |
| 5,822,539 A * | 10/1998 | van Hoff | ........... | 709/236 |
| 6,178,461 B1 * | 1/2001 | Chan et al. | ........... | 709/247 |
| 6,195,622 B1 * | 2/2001 | Altschuler et al. | ........... | 703/2 |
| 6,253,234 B1 * | 6/2001 | Hunt et al. | ........... | 709/213 |
| 6,330,606 B1 * | 12/2001 | Logue et al. | ........... | 709/226 |
| 6,496,858 B1 * | 12/2002 | Frailong et al. | ........... | 709/221 |
| 6,557,026 B1 * | 4/2003 | Stephens, Jr. | ........... | 709/203 |
| 6,678,793 B1 * | 1/2004 | Doyle | ........... | 711/133 |
| 6,732,178 B1 * | 5/2004 | Van Horne et al. | ........... | 709/227 |
| 6,857,009 B1 * | 2/2005 | Ferreria et al. | ........... | 709/219 |
| 6,901,436 B1 * | 5/2005 | Schneider | ........... | 709/219 |
| 6,920,615 B1 * | 7/2005 | Campbell et al. | ........... | 715/742 |
| 6,938,079 B1 * | 8/2005 | Anderson et al. | ........... | 709/222 |
| 2001/0003828 A1 * | 6/2001 | Peterson et al. | ........... | 709/219 |
| 2002/0078453 A1 * | 6/2002 | Kuo | ........... | 725/46 |
| 2002/0087661 A1 * | 7/2002 | Matichuk et al. | ........... | 709/218 |
| 2002/0103654 A1 * | 8/2002 | Poltorak | ........... | 705/1 |
| 2002/0165784 A1 * | 11/2002 | Taggart et al. | ........... | 705/26 |
| 2002/0188484 A1 * | 12/2002 | Grover et al. | ........... | 705/4 |
| 2002/0194120 A1 * | 12/2002 | Russell et al. | ........... | 705/38 |

(Continued)

*Primary Examiner*—Thu Ha Nguyen
(74) *Attorney, Agent, or Firm*—Carr LLP

(57) ABSTRACT

The invention presents a system and a method for assisting automation control module (ACM) customers to retrieve information relevant to their specific ACM(s). A service-portal ACM combines a conventional ACM with a service portal and/or a general-purpose computer to facilitate locating relevant information by the customers. The service-portal ACM comprises a first central processing unit (CPU), and a first memory operably connected to the first CPU. A second CPU is operably connected to the first CPU, and a second memory is operably connected to the second CPU for storing a service-portal database containing a first set of service-portal data and one or more links to a second set of service-portal data stored in a remote network server. A first network interface is operably connected to the second CPU and to a gateway configured for enabling the second CPU to communicate with the remote network server.

9 Claims, 4 Drawing Sheets

U.S. PATENT DOCUMENTS

| | | |
|---|---|---|
| 2003/0055652 A1* | 3/2003 | Nichols et al. ............. 704/275 |
| 2003/0105854 A1* | 6/2003 | Thorsteinsson et al. ..... 709/223 |
| 2003/0187812 A1* | 10/2003 | Theimer et al. ............... 707/1 |
| 2003/0215068 A1* | 11/2003 | Stein et al. .............. 379/88.17 |
| 2004/0073574 A1* | 4/2004 | Shimizu et al. .......... 707/104.1 |
| 2005/0027887 A1* | 2/2005 | Zimler et al. ............... 709/249 |
| 2005/0038869 A1* | 2/2005 | Zimler et al. ............... 709/217 |
| 2005/0197927 A1* | 9/2005 | Martineau et al. ............ 705/27 |

* cited by examiner

SERVICE-PORTAL ENABLED AUTOMATION CONTROL MODULE (ACM)

BACKGROUND OF INVENTION

The invention relates generally to a system and a method for improving customer accessibility to service-portal data of automation control modules (ACMs) and, more particularly, to a system and a method for providing ACM customers with a service-portal enabled ACM.

Automation customers need access to additional product, accessory, or service information in order to evaluate, design, implement, commission, and/or maintain their automation system. With the acceptance of the World-Wide Web ("Web") as a standard source of information, customers typically have access to standard Web browsers which can be used to obtain information on automation products such as automation control modules (ACMs). However, the links to such information may not always be immediately available to the customer. Moreover, some links may lead to incorrect information, in part because some customers may not be aware of minor differences between similar products and/or services provided by a manufacturer or vendor. Thus, the customers need to verify product information using more conventional ways of communication such as telephone communication.

Normally, ACM manufacturers and vendors provide information on their products and/or services in their Web sites. More often than not, however, customers desire information relevant only to their ACMs. Thus, they may have to spend much time and effort in looking up the right information.

Further, automation customers use Web server information on an ACM in their daily automation activities to monitor and control automation operations. During these activities, the customers are likely to need additional information to support evaluation, design, implementation, commissioning, and maintenance of automation equipment or services.

Accordingly, there is a need for a system and a method for providing ACM customers with customer-specific information on the products that they are using.

SUMMARY OF INVENTION

The present invention includes a service-portal automation control module (ACM). The service-portal ACM comprises a first central processing unit (CPU); a first memory operably connected to the first CPU; a second CPU operably connected to the first CPU; a second memory operably connected to the second CPU; and a first network interface operably connected to the second CPU and to a gateway.

The first CPU is configured for processing automation control signals. The second memory contains a first set of service-portal data and one or more links to a second set of service-portal data stored in a remote network server. The first network is configured for enabling the second CPU to communicate with the remote network server.

The present invention also discloses a method for displaying service-portal data relevant to a user's ACM in a web browser. The method comprises the steps of opening the web browser in a computer; requesting service-portal data relevant to a user's ACM; determining whether the requested service-portal data is stored in a service-portal database stored in a memory operably connected to the computer; retrieving the requested service-portal data from the service-portal database; and displaying the requested service-portal data in the Web browser.

The method also comprises the steps of opening the web browser in a computer; requesting service-portal data relevant to a user's ACM; determining whether the requested service-portal data is stored in a service-portal database stored in a memory operably connected to the computer; retrieving at least one link to the requested service-portal data from the service-portal database; retrieving the requested service-portal data from an ACM-manufacturer network server; and displaying the requested service-portal data in the Web browser.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiment depicted in FIGS. 1-4.

Figure 1:
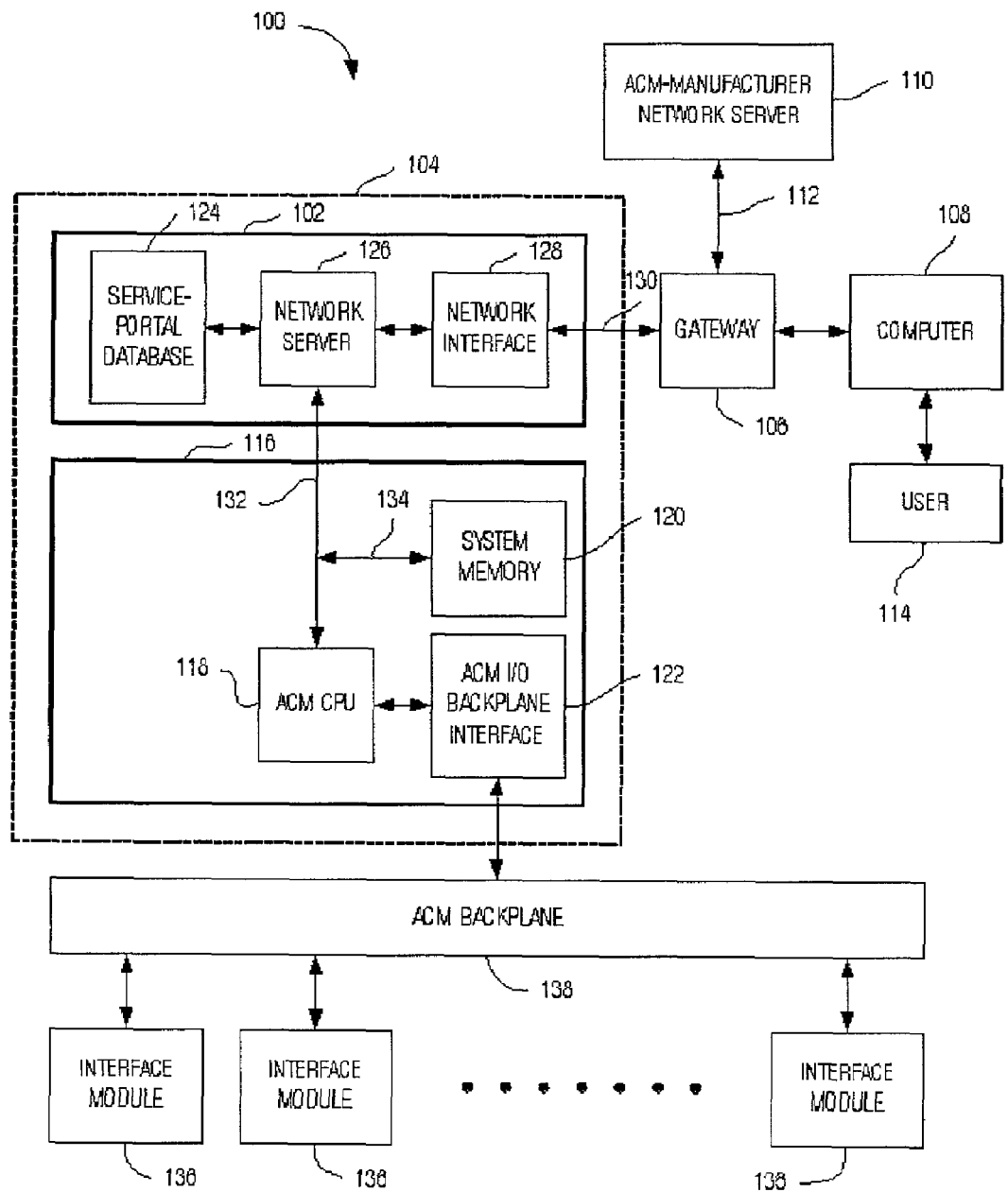
FIG. 1 depicts a high-level block diagram showing a system embodying features of the present invention.

Referring to FIG. 1, the reference numeral 100 designates a high-level description of a system embodying the present invention. The system 100 includes a service-portal and network-server subsystem ("service portal") 102 embedded in a service-portal automation control module (ACM) 104.

The system 100 preferably includes a gateway 106, which comprises a physical medium and intermediate devices such as routers and switches, not shown, but considered to be well-known in the art. The gateway 106 preferably connects a general-purpose computer 108 to the ACM 104 through the service portal 102 embedded in the service-portal ACM 104. The gateway 106 is preferably also connected to an ACM-manufacturer network server 110 through a connection 112.

Typically, the connection 112 is the Internet, however, it may also be other types of connections such as a direct serial connection. Preferably, the ACM-manufacturer network server 110 is a network server maintained by an ACM manufacturer. In a preferred embodiment, the ACM-manufacturer network server 110 is a Web server configured for providing Web pages via the Internet.

Preferably, the general-purpose computer 108 is equipped with interconnected components (not shown) such as a CPU, a memory, a network interface, and a user interface. The memory generally comprises one or more storage devices including but not limited to a hard drive, RAM, ROM, and a tape drive, or any combination thereof. In a preferred embodiment, the general-purpose computer 108 functions as a client computer running a Web browser or any other software tool that makes request(s) to download serviceportal Web page(s) from the ACM-manufacturer network server 110 to the service-portal ACM 104 through the gateway 106.

The block 116 designates a conventional ACM without the service-portal functionality provided by the service portal 102. Generally, the conventional ACM 116 comprises an ACM CPU 118, a system memory 120, and an ACM I/O backplane interface ("backplane interface") 122. The ACM CPU 118 carries out typical ACM functions such as user logic and function block execution, I/O scanning, and communications to other devices. Generally, an ACM includes any device used to control the automation of an activity. Examples of ACMs include, but are not limited to, programmable logic controllers (PLCs), computer numeral controllers (CNCs), motion control products, home automation products, and commercial automation products. Accordingly, the conventional ACM 116 may include additional elements not shown in FIG. 1, but are considered to be well-known in the art.

The system memory 120 generally comprises one or more storage devices (not shown) including, but not limited to, a hard drive, RAM, ROM, and a tape drive, or any combination thereof. Preferably, the system memory 120 stores ACM CPU 118's operating system software, the ACM's automation control program(s) and data, and a configuration file (not shown). Alternatively, the configuration file may be stored in a memory (not shown) of the service-portal ACM 102. The configuration file refers to a file describing the location, type, mapping, and option selections for all modules in the service-portal ACM 104. Preferably, the configuration file is downloaded from the ACM-manufacturer network server 110 to the service-portal ACM 104 via the gateway 106 and the connection 112. Alternatively, the configuration file may be stored in the system memory 120 via a direct serial connection to the ACM from a general purpose computer (not shown but well-known in the art) or stored at the time the conventional ACM 116 is manufactured.

The service portal 102 preferably comprises service-portal database 124, a network server 126, and a network interface 128. The service-portal database 124 includes service-portal data and/or links to service-portal data stored in the ACM-manufacturer network server 110. In a preferred embodiment, the service-portal database 124 takes a Hypertext-Markup-Language (HTML) or Extensible Markup Language (XML) form or any form equivalent thereto to facilitate communications using HyperText Transfer Protocol (HTTP) or any equivalent protocol via the gateway 106. For example, the user 114 may click the links to automatically connect to the ACM-manufacturer network server 110 to bring up the requested service-portal data stored therein. Preferably, the service-portal database 124 is stored in a memory (not shown) of the network server 126, which generally comprises one or more storage devices including, but not limited to, a hard drive, RAM, ROM, and a tape drive, and the like, or any combination thereof. The network server 126 has its own CPU and/or logic circuits to process instructions relating to the communications with the general-purpose computer 108 and the ACM-manufacturer network server 110 through the network interface 128 and the gateway 106. The network interface 128 provides a low-level protocol such as TCP/IP, as well as physical connections to the gateway 106 through a connection 130. The connection 130, along with the service portal 102 and the general-purpose computer 108, may constitute a direct serial network, a local area network (LAN), or other types of local networks preferably compatible with TCP/IP protocol or equivalent protocol.

The service-portal data includes any useful information to help customers evaluate, order, or use products and/or services. For example, the service-portal data may include, but is not limited to, pricing, order information, trouble shooting, knowledge base, data sheets, start-up information, application notes, wiring diagrams, firmware downloads, product registration, warranty information, sales promotions, payment options, financing, manufacturer's home page, and the like. A user 114 may use the general-purpose computer 108 to view service-portal data transmitted from the ACM-manufacturer network server 110.

In a preferred embodiment, the service-portal data stored in the service-portal database 124 is customer-specific data frequently requested by the user 114 and most relevant to the ACM and its configuration file. Since the network server 126 can independently communicate with the ACM-manufacturer network server 110 as mentioned above, customer-specific service portal data may be transmitted from the ACM-manufacturer network server 110 to the service portal 102, based on the information contained in the configuration file. Alternatively, the user 114 may initiate such transmission through the user interface of the general-purpose computer 108. In any case, the service-portal database 124 contains links to such data normally available from the ACM-manufacturer network server 110. Since the server-portal database 124 contains the requested data itself and/or a link to such data, the user 114 may efficiently retrieve any server-portal data.

Preferably, the network server 126 receives HTTP requests from the general-purpose computer 108 via the network interface 128 and gateway 106. Typically, these requests use the HTTP "Get" command to request the service-portal Web page(s). Then, the network server 126 retrieves the service-portal Web page(s) and provides an HTTP response back to the general-purpose computer 108. A more detailed illustration of the mode of operations is provided below with respect to FIG. 4.

The service portal 102 communicates with the conventional ACM 116 through a connection 132. Preferably, the connection 132 is a system bus connecting the network server 126 and the ACM CPU 118. As shown in FIG. 1, the system memory 120 may have direct access to the connection 132 through a separate system bus 134. Alternatively, the system buses 132 and 134 may be integrated as a single system bus. Also, the connection 132 may include some interfacing schemes not shown. Since these schemes are generally well-known in the art, they are not illustrated herein.

The ACM CPU 118 communicates with one or more interface modules 136 via an ACM backplane 138. The backplane interface 122 provides an interface between the ACM CPU 118 and the interface modules 136. The ACM backplane 138 provides a physical and electrical means for connecting various interface modules 136 to the ACM CPU 118 so that data can be exchanged between the interface modules 136 and the ACM CPU 118.

The interface modules 136 provide an interface for real-world inputs to the ACM CPU 118 as parameters for logic and/or function block execution. Examples of such real-world inputs include, but are not limited to, limit/proximity switch status, the position of an object, temperature, pressure, and the like. Additionally, the interface modules 136 provide an interface to real-world outputs as commanded by the ACM CPU 118 to control output devices such as actuators, contactors, and solenoids. The interface module 136 can perform I/O interface or other types of interface, including but not limited to interfaces to various communications networks/protocols such as RS-232, Profibus, DeviceNet etc., interface to servo motors for controlling position and speed of motors, pulse counting, voice and/or video input/output. Multiple interface modules 136 may be connected to the ACM backplane 138, and overall system performance varies proportionally to the number of interface modules 136 connected to the ACM backplane 138.

Figure 2:
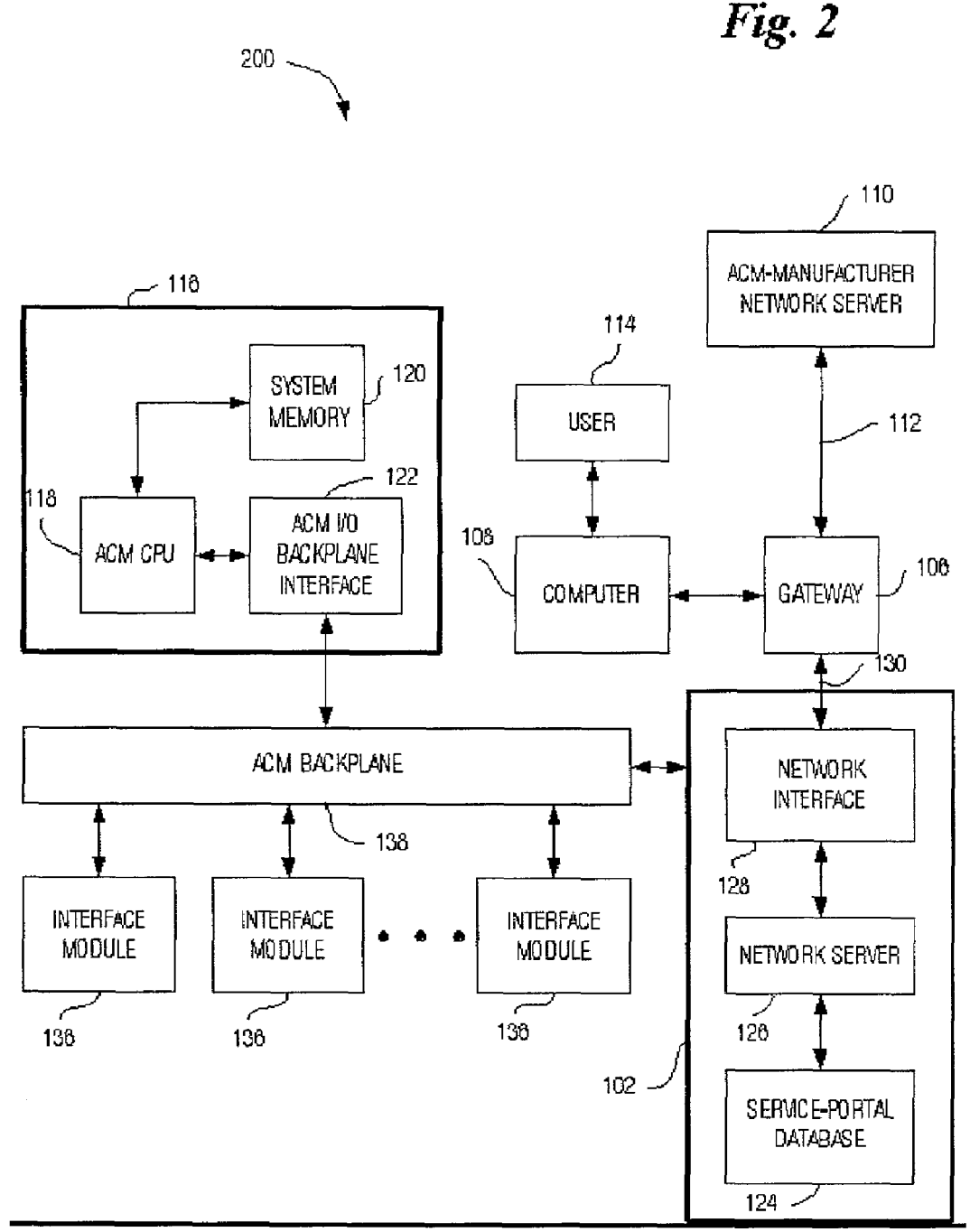
FIG. 2 depicts a high-level block diagram showing an alternate system embodying features of the present invention.

FIG. 2 depicts a high-level description of a system 200 embodying features of the present invention. The system 200 is similar to the system 100 of FIG. 1, except that the service portal 102 of FIG. 2 is not embedded in the service-portal ACM 104 as shown in FIG. 1. Instead, the service portal 102 of FIG. 2 is a separate module connected to the conventional ACM 116 via ACM backplane 138. As shown in FIG. 2, the ACM backplane 138 is connected to the service portal 102, and preferably to the network server 126. Except for this difference in the implementation of the service portal 102, the underlying principle of the system 200 is substantially the same as that of the system 100 and, therefore, is not described in further detail herein.

Figure 3:
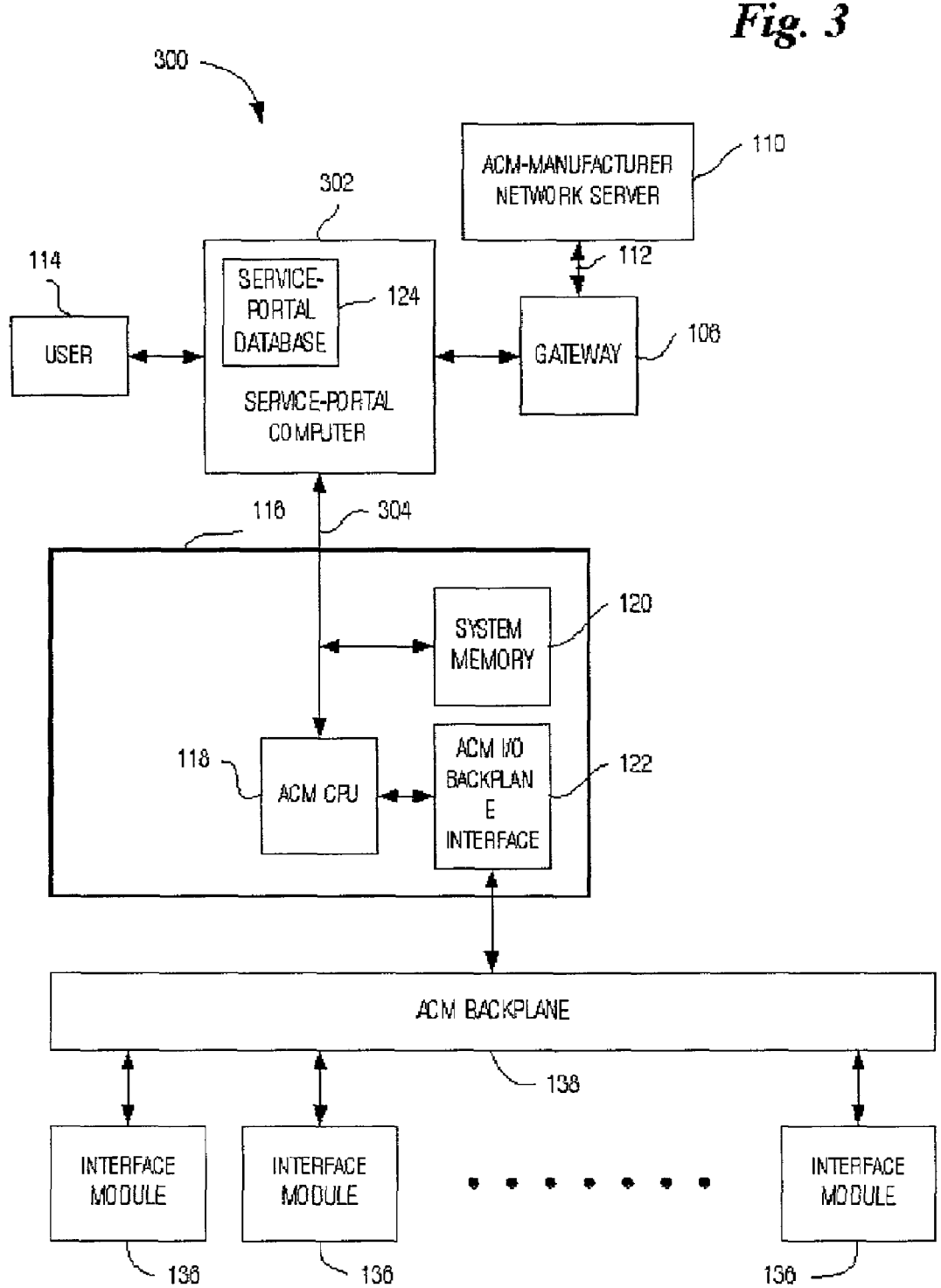
FIG. 3 depicts a high-level block diagram showing still another embodiment of the present invention.

FIG. 3 depicts a high-level description of a system 300 embodying features of the present invention. The system 300 is similar to the system 100 of FIG. 1 and the system 200 of FIG. 2, except that a service-portal computer 302 combines the functionalities of the general-purpose computer 108 and the service portal 102 as set forth in FIGS. 1 and 2. In this configuration, the service-portal computer 302 directly communicates with the conventional ACM 116, or preferably with the ACM CPU 118 and the system memory 120, through a connection 304. The service-portal database 124 is stored in the service-portal computer 302, preferably in a memory or storage medium (not shown) of the service-portal computer 302. The detailed structure of the service-portal computer 302 is not shown in FIG. 3, because it is substantially similar to that of any general-purpose computer.

The service-portal computer 302 could be implemented in many different ways, while still being consistent with the spirit of the present invention. For example, the service-portal computer 302 may comprise the general-purpose computer 108, wherein the service-portal database 124 as shown in FIGS. 1 and 2 is stored. The service-portal data could be directly downloaded from the ACM-manufacturer network server 110 or provided off-line by the manufacturer of the conventional ACM 116. In this case, the general-purpose computer 108 is preferably equipped with the ability to communicate with the conventional ACM 116 and the network. Alternatively, the computer/substation 302 may comprise the service portal 102 with a user interface available in the general-purpose computer 108.

Except for the fact that the service-portal computer 302 replaces the service portal 102 and the general-purpose computer 108, the underlying principle of the system 300 is substantially similar to those of the systems 100 and 200 and, therefore, is not described in further detail herein.

Figure 4:
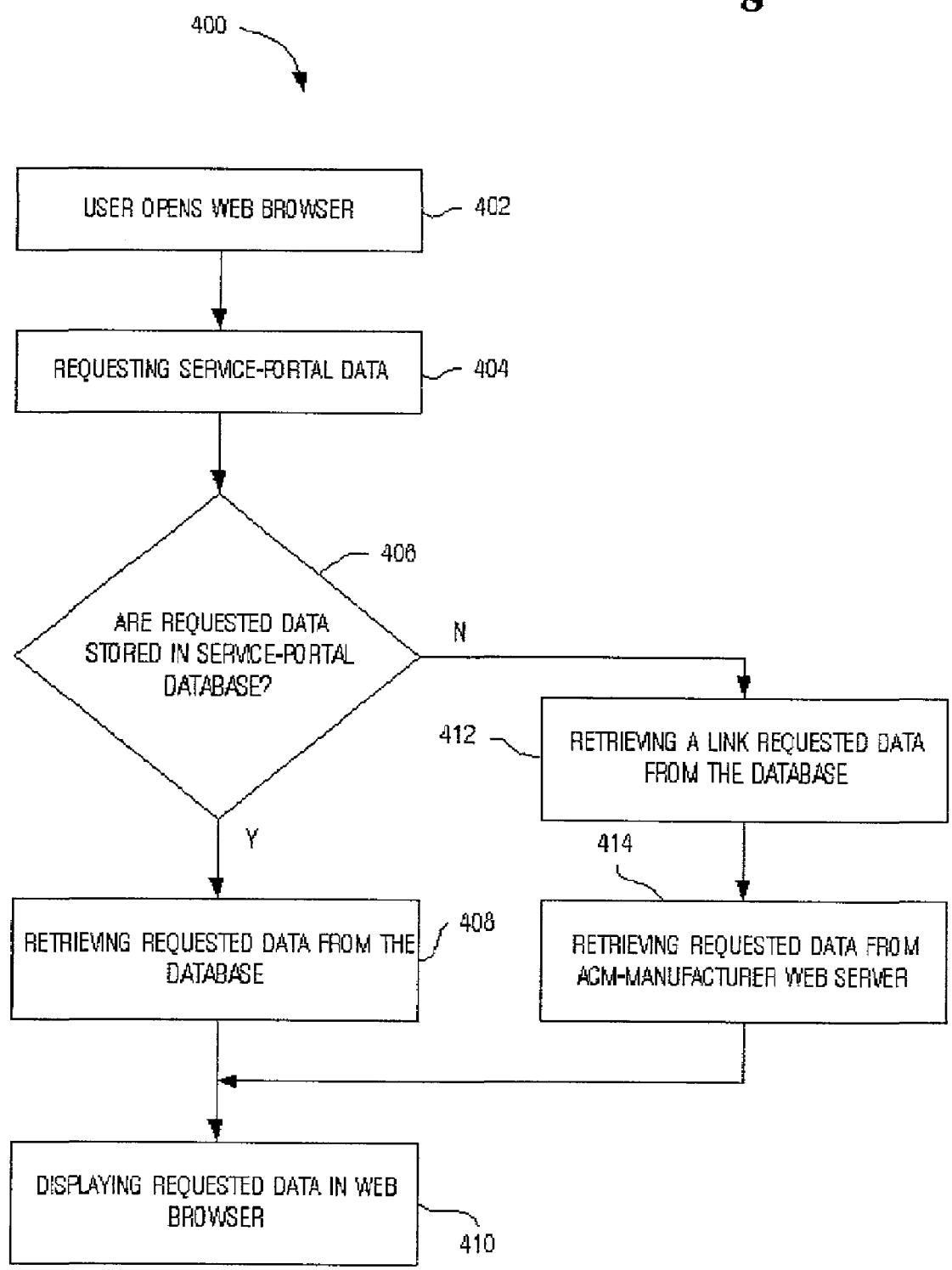
FIG. 4 depicts a flow diagram illustrating a principle mode of operation according to the present invention.

FIG. 4 depicts a flow chart 400 illustrating a principle mode of operation according to the present invention. Since the systems 100, 200, and 300 differ in their structural configurations only, the flow chart 400 is equally applicable to the systems 100, 200, and 300, except for some minor details. Separate explanations will be provided for different configurations adopted by the systems 100, 200, and 300.

Preferably, automation customers such as the user 114 described in FIGS. 1, 2, and 3 use a Web-server interface in their daily automation activities to monitor and control automation operations. During these activities, the customers are likely to need additional information to support evaluation, designing, implementing, commissioning, or maintaining automation equipment or services. In step 402, the user opens a Web browser from the general-purpose computer 108 (as in FIGS. 1 and 2) or service-portal computer 302 (as in FIG. 3). In this step, the user 114 using the system 100 or 200 interacts with the general-purpose computer 108. The user 114 using the system 300 interacts with the service-portal computer 302.

In step 404, the user 114 requests service-portal data by using the Web browser. In FIGS. 2 and 3, the Web browser shows a Web page available from the service portal 124. In FIG. 3, the Web page is stored in the service-portal computer 302. In order to bring up the correct Web page containing the requested service-portal data, the user 114 types in the address of the Web page. Alternatively, the Web browser may already have the address information as a shortcut. Once the Web page is accessed, the user 14 selects text or an image indicating the requested service-portal data by using a user interface of the general-purpose computer 108 or the service-portal computer 302. Typically, the user 14 clicks on text or image using a mouse connected to the general-purpose computer 108 or the service-portal computer 302. Once the user 114 initiates this action, a control signal indicating the action triggers step 406.

In step 406, the service portal 102 (FIGS. 1 and 2) or the service-portal computer 302 (FIG. 3) determines whether the requested data is stored in the service-portal database 124. If it is stored there, the requested data is retrieved from the service-portal database 124, as in step 408 below. The retrieved data is then displayed in the Web browser, as in step 410.

If, in step 406, it is determined that the requested data is not stored in the service-portal database 124, then a link to the requested data is retrieved from the service-portal database 124, as in step 412. Thus in step 414, the requested data is automatically retrieved from the ACM-manufacturer network server 110, to which the link points. Finally, the requested data is displayed in the Web browser in step 410.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

The invention claimed is:

1. A service-portal enabled automation control module (ACM) configured to control a physical activity and being of a type, said ACM comprising:

a first central processing unit (CPU) configured for processing automation control signals to control a physical activity and configured for receiving telemetry data;

a first memory operably connected to said first CPU;

a second CPU operably connected to said first CPU;

a second memory operably connected to said second CPU for storing a service-portal database containing a first set of service-portal data specific to said ACM and relating to determination of servicing recommendations for said ACM and one or more links to a second set of service-portal data relating to the type of said ACM stored in a remote network server and relating to servicing recommendations for said type of ACM; and a first network interface operably connected to said second CPU and to a gateway configured for enabling said second CPU to communicate with said remote network server to transmit data relating to servicing recommendations to a user through a user interface operably connected to said remote network server and configured for enabling said user to request said first set of service-portal data from said second memory and said second set of service-portal data from said remote network server and to display said second set of service-portal data to said user.

2. The service-portal enabled ACM of claim 1, further comprising:
   a backplane interface operably connected to said first CPU;
   an ACM backplane operably connected to said backplane interface; and
   an interface module operably connected to said ACM backplane.

3. The service-portal enabled ACM of claim 1, wherein said first memory stores a configuration file containing specific information on said service-portal enabled ACM.

4. The service-portal enabled ACM of claim 1, wherein said second CPU is configured for functioning as a network server.

5. The service-portal enabled ACM of claim 1, wherein said first network interface supports one or more low-level protocols including TCP/IP protocol.

6. The service-portal enabled ACM of claim 1, wherein said gateway is configured for enabling said second CPU to communicate with said remote network server via Internet.

7. The service-portal enabled ACM of claim 1, further comprising a user interface operably connected to said second CPU and configured for enabling a user to request said first set of service-portal data from said second memory and said second set of service-portal data from said remote network server.

8. The service-portal enabled ACM of claim 7, wherein said second memory is configured for loading at least one Web browser to open Web pages stored in said second memory.

9. The service-portal enabled ACM of claim 1, further comprising:
   a third CPU operably connected to said gateway and configured for communicating with said second CPU and said remote network server via said gateway; and
   a third memory operably connected to said third CPU and configured for loading at least one Web browser to open Web pages stored in said second memory.

* * * * *